US011159991B2

(12) United States Patent
Lu et al.

(10) Patent No.: US 11,159,991 B2
(45) Date of Patent: Oct. 26, 2021

(54) METHOD, APPARATUS AND DEVICE FOR ALLOWING TERMINAL TO MOVE BETWEEN 4G AND 5G NETWORKS

(71) Applicant: ZTE CORPORATION, Guangdong (CN)

(72) Inventors: Fei Lu, Shenzhen (CN); Zhendong Li, Shenzhen (CN); Jinguo Zhu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 16/575,550

(22) Filed: Sep. 19, 2019

(65) Prior Publication Data
US 2020/0084675 A1 Mar. 12, 2020

Related U.S. Application Data

(63) Continuation of application No. PCT/CN2018/072779, filed on Jan. 16, 2018.

(30) Foreign Application Priority Data

Mar. 20, 2017 (CN) .......................... 201710166973.6

(51) Int. Cl.
H04W 4/00 (2018.01)
H04W 36/00 (2009.01)
(Continued)

(52) U.S. Cl.
CPC ... *H04W 36/0022* (2013.01); *H04W 36/0033* (2013.01); *H04W 48/16* (2013.01);
(Continued)

(58) Field of Classification Search
CPC .............. H04B 7/18541; H04W 36/00; H04W 36/0005
See application file for complete search history.

(56) References Cited

U.S. PATENT DOCUMENTS

2014/0003241 A1* 1/2014 Kim ..................... H04W 36/34
370/235
2014/0302812 A1* 10/2014 Yu ......................... H04W 60/00
455/406
(Continued)

FOREIGN PATENT DOCUMENTS

CN 101595752 A 12/2009
CN 103430580 A 12/2013
(Continued)

OTHER PUBLICATIONS

International Search Report and Written Opinion for International Appl. No. PCT/CN2018/072779, dated Apr. 20, 2018.
(Continued)

*Primary Examiner* — Shantell L Heiber
(74) *Attorney, Agent, or Firm* — Foley & Lardner LLP

(57) ABSTRACT

Provided are a method, apparatus and device for a terminal moving between a 4G network and a 5G network. The method includes: transmitting, by a management device corresponding to a target network, an access accept message, where the access accept message carries an activation indication; and the activation indication is used for indicating a terminal to reactivate a public data network (PDN) connection or a protocol data unit (PDU) session in a source network in the target network, or indicating the terminal that the PDN connection or the PDU session has been activated in the target network.

12 Claims, 7 Drawing Sheets

(51) Int. Cl.
*H04W 76/12* (2018.01)
*H04W 76/11* (2018.01)
*H04W 76/27* (2018.01)
*H04W 48/16* (2009.01)
*H04W 60/00* (2009.01)
*H04W 80/10* (2009.01)

(52) U.S. Cl.
CPC ............ *H04W 60/00* (2013.01); *H04W 76/11* (2018.02); *H04W 76/12* (2018.02); *H04W 76/27* (2018.02); *H04W 80/10* (2013.01)

(56) References Cited

U.S. PATENT DOCUMENTS

| | | | |
|---|---|---|---|
| 2015/0003415 A1 | 1/2015 | Muley et al. | |
| 2015/0029999 A1* | 1/2015 | Horn | H04W 76/12 370/331 |
| 2016/0057658 A1 | 2/2016 | Horn et al. | |
| 2016/0360345 A1* | 12/2016 | Kim | H04W 8/005 |
| 2017/0034749 A1 | 2/2017 | Chandramouli et al. | |
| 2017/0265113 A1* | 9/2017 | Lindoff | H04W 36/14 |
| 2019/0045423 A1* | 2/2019 | Kumar | H04W 60/04 |
| 2020/0084675 A1 | 3/2020 | Lu et al. | |

FOREIGN PATENT DOCUMENTS

| | | |
|---|---|---|
| CN | 104185302 A | 12/2014 |
| CN | 106465080 A | 2/2017 |
| EP | 3 432 641 A1 | 1/2019 |
| EP | 3 606 165 A1 | 2/2020 |
| WO | WO-2018/171310 A1 | 9/2018 |

OTHER PUBLICATIONS

Qualcomm Incorproated, "Mobility inside 5GC and between 5GC and EPC for interworking scenarios," 3GPP SA WG2 Meeting #S2-119, S2-170743, Dubrovnik, Croatia, Feb. 13-17, 2017.

Extended European Search Report on EP 18772060.2 dated Feb. 13, 2020 (11 pages).

NTT Docomo et al., "Single-registration with no Nx", 3GPP Draft, SA WG2 Meeting #122, S-174568, Jun. 25, 2017 (16 pages).

NTT Docomo, "Interworking between NGC and EPC", 3GPP Draft, S2-170934, Feb. 13, 2017 (22 pages).

First Office Action on CN 201710166973.6, dated Mar. 1, 2021 (8 pages).

Qualcomm Incorporated, "23.501—PDU Session mobility between systems for EPS interworking", SA WG2 Meeting #S2-119; S2-170759, Dubrovnik, Croatia, Feb. 13, 2017 (4 pages).

* cited by examiner

METHOD, APPARATUS AND DEVICE FOR ALLOWING TERMINAL TO MOVE BETWEEN 4G AND 5G NETWORKS

CROSS-REFERENCE TO RELATED APPLICATIONS

This application claims the benefit of priority under 35 U.S.C. § 120 as a continuation of PCT Patent Application No. PCT/CN2018/072,779 filed on Jan. 16, 2018, which claims priority to Chinese patent application No. 201710166973.6 filed on Mar. 20, 2017, the disclosure of each of which is incorporated herein by reference in its entirety.

TECHNICAL FIELD

The present disclosure relates to the field of mobile communication technologies and, in particular, to a method, device and apparatus for switching a terminal between a 4th generation (4G) network and a 5th generation (5G) network.

BACKGROUND

Mobile communication technology has now advanced to a 4G stage. Compared with previous generations, a main feature of the 4G network architecture is based on all-IP transmission. At present, 3GPP is studying the 5G network architecture, and FIG. 1 is an architecture for interworking between a 4G network and a 5G network. The functions of each network element in the network architecture are as follows:

A user equipment (UE) is accessed to the 4G network and obtains services mainly through a wireless air interface. The UE interacts with a base station through the air interface, and interacts with a mobility management entity (MME) in a core network via non-access-stratum (NAS) signaling.

A radio access network (RAN) is responsible for air interface resource scheduling and air interface connection management of a network to which the UE is accessed to. In the 4G network, the RAN is called as an eNodeB, and in the 5G network, the RAN is called as an NG RAN.

A mobility management entity (MME), as a core network control plane unit, is mainly responsible for: user authentication, authorization and subscription checking, to ensure that a user is a legitimate user; user mobility management, including location registration and temporary identifier allocation; maintenance and migration of an IDLE state and a CONNECTED state; a handover in the CONNECTED state; connection and bearer maintenance of the packet data network (PDN), including session management functions like creation, modification and deletion; paging triggering in an IDLE state of a user, and other functions. In the 5G core network, an authentication management function (AMF) entity mainly controls the user mobility management, including: the location registration and the temporary identifier allocation; the maintenance and migration of the IDLE state and the CONNECTED state. A session management function (SMF) entity function mainly includes maintenance of a protocol data unit (PDU) session, including: session management functions like creation, modification and deletion; paging triggering in an IDLE state of a user, and other functions.

A serving gateway (SGW), as a user plane functional entity of a core network, is mainly responsible for interacting with a packet data network (PDN) gateway in a case of roaming; caching downlink data packets received when a user is in the IDLE state and notifying the MME to page the user; and acting as the anchor for the user plane during inter-RAN handovers and as the anchor for mobility across 2G/3G/4G systems.

A UPF is a user plane access point of the terminal accessing a PDN network, and may be responsible for allocating user IP address, and is an anchor for the user switching/moving a 4G system or between the 4G system and a 5G system, thereby ensuring the service continuity.

A home subscriber server (HSS) is an important part of a control layer in an IP multimedia subsystem (IMS). Processable information of the HSS includes: user identification, number and address information; user security information, i.e., network access control information for authentication and authorization; user positioning information, i.e., HSS supports user registration, storage location information; user list information.

When the UE moves to the 5G network, the UE transmits a registration request message to the AMF, the AMF returns a registration accept message, the registration accept message carries a newly allocated global unique temporary UE identifier (GUTI) and a valid tracking area identifier list (TAI list), however, the TAI list cannot include a tracking area (TA) in the 4G network. The registration accept message further needs to carry a single registration indication or a dual registration indication. The single registration indication is used for indicating the UE to use a tracking area update (TAU) procedure when moving to 4G; and the dual registration indication is used for indicating the UE to use a handover attach procedure to access to the 4G network when moving to 4G; this indication is only applicable to the current TAI list.

When the UE moves from the 5G network into the 4G network, since the 4G TA selected to access to is not in the above TAI list, and the single registration indication/dual registration indication is invalid in the newly selected TA, the UE cannot determine whether to transmit the TAU request message or perform the handover attach procedure. Moreover, if the UE transmits the TAU request message, but if no Nx interface exists between the MME and the AMF to which the UE originally accesses, the MME cannot acquire a mobility management context of the UE from the AMF, thus the MME may reject the access of the UE (the MME returns a TAU rejection message to the UE); after the UE receives the TAU rejection message of the MME, the UE restarts the initial attachment procedure again, this will generate more signaling. If the UE directly performs the handover attach procedure, but if the Nx interface exists between the MME and the AMF to which the UE originally accesses, the handover attach procedure also brings redundant signaling.

SUMMARY

To solve the existing technical problem, embodiments of the present disclosure provide a method, apparatus and device for switching a terminal between a fourth generation (4G) network and a 5th generation (5G) network.

To achieve the preceding object, solutions in the embodiments of the present disclosure are implemented as follows:

embodiments of the present disclosure provide a method for switching a terminal between a 4G network and a 5G network. The method includes:

transmitting, by a management device corresponding to a target network, an access accept message, wherein the access accept message carries an activation indication;

wherein the activation indication is used for indicating a terminal to reactivate a public data network (PDN) connection or a protocol data unit (PDU) session of a source network in a target network, or indicating the terminal that the PDN connection or the PDU session has been activated in the target network.

Optionally, before transmitting, by the management device corresponding to the target network, the access accept message to the terminal, the method further includes:

determining, by the management device corresponding to the target network, whether a Nx interface exists between the management device corresponding to the target network and a management device corresponding to the source network; in response to determining that no Nx interface exists, the management device corresponding to the target network determines to be incapable of acquiring a mobility management context from the management device corresponding to the source network.

Optionally, in response to determining that the management device corresponding to the target network determines that the Nx interface exists between the management device corresponding to the target network and the management device corresponding to the source network, the method further including:

determining, by the management device corresponding to the target network, to be capable of acquiring the mobility management context from the management device corresponding to the source network.

wherein, in response to determining by the management device corresponding to the target network that no Nx interface exists between the management device corresponding to the target network and the management device corresponding to the source network, the activation indication carried in the access accept message is used for indicating the terminal to reactivate the PDN connection or the PDU session in the source network in the target network.

wherein, in response to determining by the management device corresponding to the target network that the Nx interface exists between the management device corresponding to the target network and the management device corresponding to the source network, the activation indication carried in the access accept message is used for indicating the terminal that the PDN connection or the PDU session has been activated in the target network.

The embodiments of the present disclosure further provide a method for switching a terminal between a 4G network and a 5G network. The method includes:

receiving, by a terminal, an access accept message, wherein the access accept message carries an activation indication; and the activation indication is used for indicating a terminal to reactivate a public data network (PDN) connection or a protocol data unit (PDU) session of a source network in a target network, or indicating the terminal that the PDN connection or the PDU session has been activated in the target network.

when the access accept message is used for indicating the terminal to reactivate the PDN connection or the PDU session in the source network in the target network, the method further comprises the following after receiving, by the terminal, the access accept message:

transmitting, by the terminal, a PDN connection activation request message or a PDU session activation request message, the PDN connection activation request message or the PDU session activation request message carries a handover indication.

The embodiments of the present disclosure further provide a device for switching a terminal between a 4G network and a 5G network. The device includes:

a first transmission module, which is configured to transmit an access accept message, where the access accept message carries an activation indication;

wherein the activation indication is used for indicating a terminal to reactivate a public data network (PDN) connection or a protocol data unit (PDU) session in a source network in a target network, or indicating the terminal that the PDN connection or the PDU session has been activated in the target network.

Optionally, the device further includes:

a determination module, which is configured to determine, before the transmission module transmits the access accept message, whether a Nx interface exists between a management device corresponding to the target network and a management device corresponding to the source network; in response to determining that no Nx interface exists, determine the management device corresponding to the target network to be incapable of acquiring a mobility management context from the management device corresponding to the source network.

In an optional embodiment, the determination module is further configured to determine, in response to determining that the Nx interface exists between the management device corresponding to the target network and the management device corresponding to the source network, the management device corresponding to the target network to be capable of acquiring the mobility management context from the management device corresponding to the source network.

In response to determining that no Nx interface exists between the management device corresponding to the target network and the management device corresponding to the source network, the activation indication is used for indicating the terminal to reactivate the PDN connection or the PDU session in the source network in the target network.

In response to determining that the Nx interface exists between the management device corresponding to the target network and the management device corresponding to the source network, the activation indication is used for indicating the terminal that the PDN connection or the PDU session has been activated in the target network.

The embodiments of the present disclosure further provide a network management apparatus, which includes: the aforementioned device.

The embodiments of the present disclosure further provide a device for switching a terminal between a 4G network and a 5G network. The device includes:

a reception module, which is configured to receive an access accept message, wherein the access accept message carries an activation indication; and the activation indication is used for indicating a terminal to reactivate a public data network (PDN) connection or a protocol data unit (PDU) session in a source network in a target network, or indicating the terminal that the PDN connection or the PDU session has been activated in the target network.

Optionally, the device further includes: a second transmission module when the activation indication is used for indicating the terminal to reactivate the PDN connection or the PDU session in the target network, the second transmission module is configured to transmit, after the reception module receives the access accept message, a PDN connection activation request message or a PDU session activation request message, the PDN connection activation request message or the PDU session activation request message carries a handover indication.

The embodiments of the present disclosure further provide a terminal device, which includes: the aforementioned device.

Another embodiment of the present disclosure further provides a storage medium. The storage medium stores computer programs which, when being executed, carry out the steps of any one of the aforementioned method embodiments.

Another embodiment of the present disclosure further provides an electronic apparatus, including a memory and a processor. The memory is configured to store computer programs and the processor is configured to execute the computer programs for carrying out the steps of any one of the aforementioned method embodiments.

The embodiments of the present disclosure provide a method, apparatus and device for a terminal moving between a 4G network and a 5G network. The method includes: transmitting, by a management device corresponding to a target network, an access accept message, wherein the access accept message carries an activation indication; and the activation indication is used for indicating a terminal to reactivate a public data network (PDN) connection or a protocol data unit (PDU) session in a source network in the target network, or indicating the terminal that the PDN connection or the PDU session has been activated in the target network. In the embodiments of the present disclosure, in a process of the terminal switching between the 4G network and the 5G network (moving in an idle state), the management device in the target network will notify the terminal of whether the PDN connection or the PDU session needs to be reactivated, compared with the existing art in which the terminal restarts an initial attachment process after receiving a TAU rejection message of an MME, a signaling process is reduced, network resources are saved and the energy consumption of the terminal is reduced at the same time.

In addition, the embodiments of the present disclosure further determine whether a Nx interface exists between the management device corresponding to the target network and a management device corresponding to a source network, and indicates the terminal to perform a corresponding activation operation based on different determination results, which also reduces signaling process.

DETAILED DESCRIPTION

The solution of the present disclosure will be described below in detail in conjunction with specific embodiments.

Figure 1:
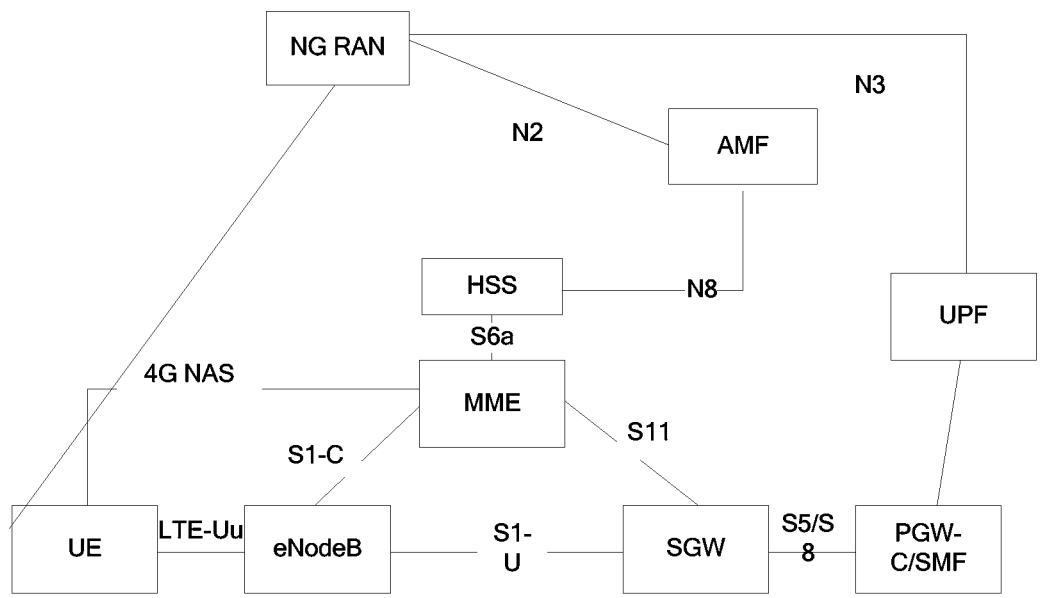
FIG. 1 is a schematic diagram of an architecture interworking between a 4G network and a 5G network in the existing art.
Figure 2:
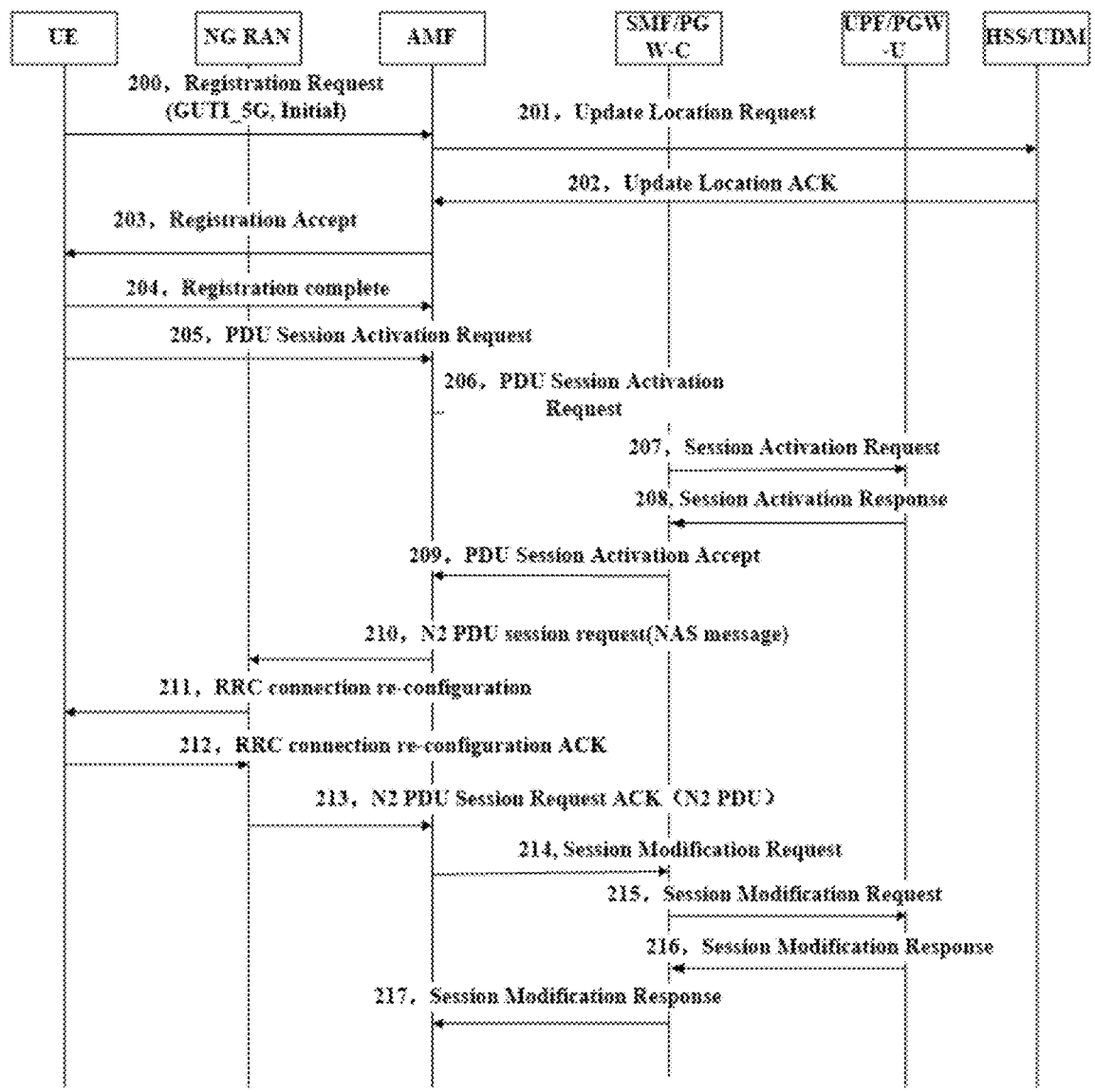
FIG. 2 is a schematic diagram of a process of a terminal accessing a 5G network and establishing a PDU session in the existing art.

For ease of understanding, a process of UE accessing a 5G network and establishing a PDU session in the existing art is introduced firstly, as shown in FIG. 2, the process includes the steps described below.

Step 200: The UE transmits a registration request message to an AMF, where the registration request message carries a global unique temporary UE identifier (GUTI) or an international mobile subscriber identity (IMSI), an initial access indication, and the initial access indication is used for notifying the network that the registration request belongs to an initial access request.

Step 201: If the GUTI is carried in step 200, the AMF needs to obtain a user IMSI through the GUTI, and the AMF transmits an update location request message to an HSS/UDM, where the message carries the user IMSI and an AMF address.

Step 202: The HSS returns an update location ACK message to the AMF, where the message carries subscription data of the user.

Step 203: If the AMF accepts the registration request, the AMF returns a registration accept message to the UE, where the message carries a newly allocated GUTI and a valid TAI list; and also the message needs to carry a single registration indication or a dual registration indication. The single registration indication is used for indicating the UE to use a TAU procedure when moving to 4G The dual registration indication is used for indicating the UE to use a handover attach procedure when moving to 4G to access to the 4G network. This indication is only applicable to the current TAI list. To ensure that the UE initiates the TAU procedure or the handover attach procedure when moving in the 4G the TAI list in this step cannot include a TA in the 4G system.

Step 204: The UE returns a registration complete message to the AMF, indicating that the GUTI becomes valid.

Step 205: The UE needs to establish a protocol PDU session, and the UE transmits a PDU session activation request message to the AMF, where the message carries a PDU session ID, a PDN type, and a DNN.

Step 206: The AMF selects an SMF according to the DNN and the PDN type, and transmits an SM session message PDU session activation request to the SMF. The SM session message carries the IMSI, the PDU session activation request message, an AMF address, a GTP-C tunnel identifier (TEID) and UE location information.

Step 207: The SMF selects a UPF according to the UE location information, the PDN type or the DNN, and transmits a session activation request message, where the message carries an SMF address, IMSI, package detection, execution, and reporting rules. If the SMF allocates TEID information used by the UPF, this step further needs to carry the TEID information used by the UPF.

Step 208: The UPF returns a session activation response message to the SMF. If the UPF allocates the TEID information used by the UPF, the step further needs to carry the TEID information used by the UPF.

Step 209: The SMF returns an SM session message PDU session activation accept to the AMF, where the message carries a PDU session ID, a QoS parameter, a TED of the UPF, and the message carries a PDU session activation accept message.

Step 210: The AMF transmits a N2 PDU session request message to a NG RAN. The message carries the PDU session ID, the QoS parameter, the TED of the UPF, and the PDU session activation accept message.

Step 211: The NG RAN transmits a RRC connection re-configuration message to the UE for establishing a radio bearer according to the QoS parameter; the RRC connection re-configuration message also carries a PDU session activation accept message.

Step 212: The UE returns a RRC connection re-configuration ACK message to the NG RAN.

Step 213: The NG RAN returns a N2 PDU session request ACK message to the AMF, and the message carries TEID information of a NG RAN N3 interface.

Step 214: The AMF transmits a session modification request message to the SMF, and the message carries the TED information of the NG RAN N3 interface acquired in the step 213.

Step 215: The SMF transmits a session modification request message to the UPF, and the message carries the TEID information of the NG RAN N3 interface acquired in the step 213. The UPF may transmit downlink data to the NG RAN after this step.

Step 216: The UPF returns a session modification response message to the SMF.

Step 217: The SMF returns the session modification response message to the AMF.

It can be seen that when the UE is switched from the 5G network to the 4G network, the TAI list in the step 203 does not include the 4G TA selected by the UE to access to after the UE moves to the 4G network, and the single registration indication/dual registration indication has been invalid in the newly selected TA.

Based on problems exist in the existing art, the embodiments of the present disclosure provide a method for switching a terminal between a 4G network and a 5G network. The method includes step described below.

Step 301: Transmit, by a management device corresponding to a target network, an access accept message, wherein the access accept message carries an activation indication.

The activation indication is used for indicating a terminal to reactivate a public data network (PDN) connection or a protocol data unit (PDU) session of a source network in the target network, or indicating the terminal that the PDN connection or the PDU session has been activated in the target network.

In the embodiments of the present disclosure, when the terminal is switched from the 5G network to the 4G network, the access accept message transmitted by the management device MME in the 4G network to the terminal is: a TAU accept message; when the terminal is switched from the 4G network to the 5G network, the access accept message transmitted by the management device AMF in the 5G network to the terminal is: the registration accept message.

In the embodiments of the present disclosure, in a process of the terminal switching between the 4G network and the 5G network (moving in an idle state), the management device in the target network will notify the terminal of whether the PDN connection or the PDU session needs to be reactivated, compared with the existing art in which the terminal restarts an initial attachment procedure after receiving a TAU rejection message from an MME, a signaling process is reduced, network resources are saved and the energy consumption of the terminal is reduced at the same time.

Figure 3:
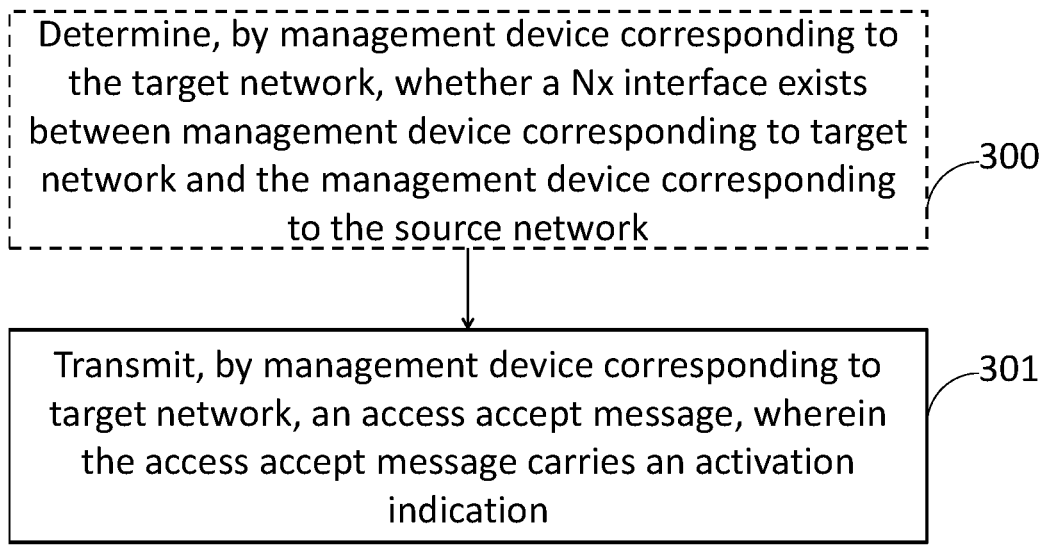
FIG. 3 is a flowchart 1 of a method for switching a terminal between a 4G network and a 5G network according to an embodiment of the present disclosure.

In the embodiment of the present disclosure, as shown in FIG. 3, before transmitting, by the management device corresponding to the target network, the access accept message to the terminal, the method further includes:

Step 300: Determine, by the management device corresponding to the target network, whether a Nx interface exists between the management device corresponding to the target network and the management device corresponding to the source network.

If no Nx interface exists, the management device corresponding to the target network determines that the mobility management context can not be acquired from the management device corresponding to the source network.

Optionally, if the management device corresponding to the target network determines that the Nx interface exists between the management device corresponding to the target network and the management device corresponding to the source network, the method further includes:

determining by the management device corresponding to the target network that the mobility management context can be acquired from the management device corresponding to the source network.

In one embodiment, if the management device corresponding to the target network determines that no Nx interface exists between the management device corresponding to the target network and the management device corresponding to the source network, the activation indication carried in the access accept message is used for indicating the terminal to reactivate the PDN connection or the PDU session of the source network in the target network.

In one embodiment, if the management device corresponding to the target network determines that the Nx interface exists between the management device corresponding to the target network and the management device corresponding to the source network, the activation indication carried in the access accept message is used for indicating the terminal that the PDN connection or the PDU session has been activated in the target network.

The embodiments of the present disclosure further determines whether the Nx interface exists between the management device corresponding to the target network and the management device corresponding to the source network, and indicates the terminal to perform the corresponding activation operation based on different determination results, which also reduces signaling process.

The embodiments of the present disclosure further provide a method for switching a terminal between a 4G network and a 5G network. The method includes:

Step 400: Receive, by a terminal, an access accept message, wherein the access accept message carries an activation indication.

The activation indication is used for indicating the terminal to reactivate a public data network (PDN) connection or a protocol data unit (PDU) session of a source network in a target network, or indicating the terminal that the PDN connection or the PDU session has been activated in the target network.

In the embodiment of the present disclosure, when the terminal is switched from the 5G network to the 4G network, the access accept message transmitted by a management device MME in the 4G network to the terminal is: a TAU accept message; when the terminal is switched from the 4G network to the 5G network, the access accept message transmitted by a management device AMF in the 5G network to the terminal is: a registration accept message.

In the embodiments of the present disclosure, in a process of the terminal switching between the 4G network and the 5G network (moving in an idle state), the management device in the target network will notify the terminal of whether the PDN connection or the PDU session needs to be reactivated, compared with the existing art in which the terminal restarts an initial attachment procedure after receiving a TAU rejection message from an MME, a signaling process is reduced, network resources are saved and the energy consumption of the terminal is reduced at the same time.

Figure 4:
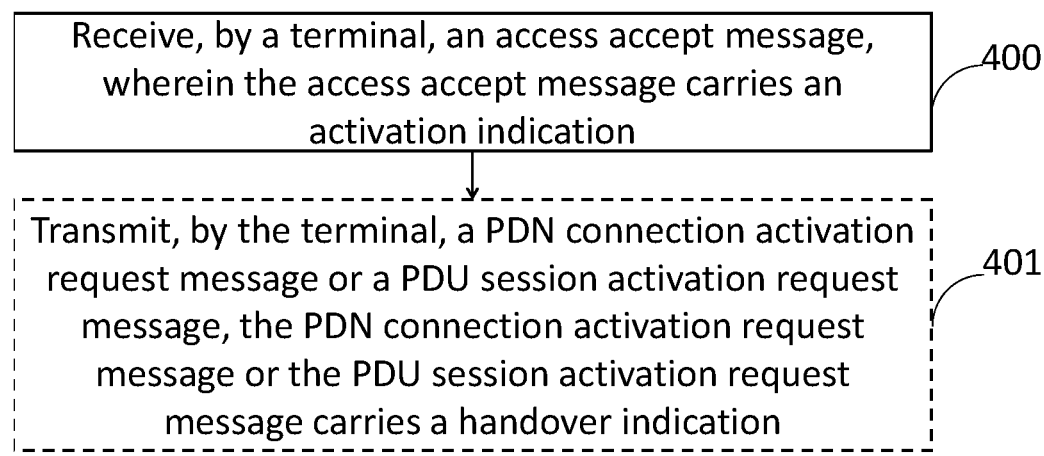
FIG. 4 is a flowchart 2 of a method for switching a terminal between a 4G network and a 5G network according to an embodiment of the present disclosure.

In one embodiment, as shown in FIG. 4, when the activation indication is used for indicating the terminal to reactivate the PDN connection or the PDU session of the source network in the target network, the method further includes the following step after receiving the access accept message by the terminal:

Step 401: Transmit, by the terminal, a PDN connection activation request message or a PDU session activation request message, the PDN connection activation request message or the PDU session activation request message carries a handover indication.

Figure 5:
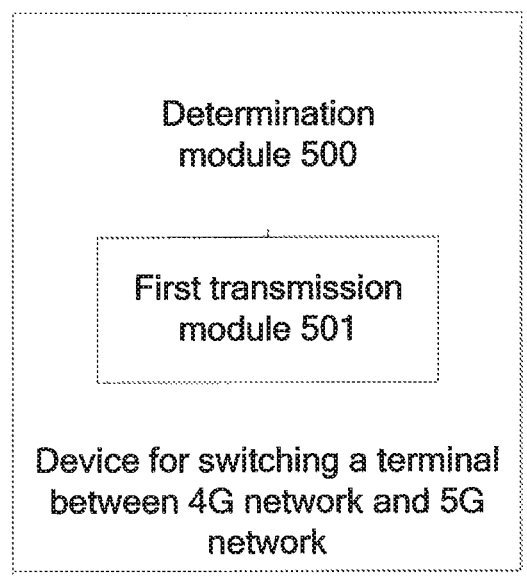
FIG. 5 is a structural diagram 1 of a device for switching a terminal between a 4G network and a 5G network according to an embodiment of the present disclosure.

The embodiment further provides a device for switching a terminal between a 4G network and a 5G network. The device is configured to implement the above-mentioned embodiments. What has been described will not be repeated. As used below, a term "module" may be software, hardware or a combination thereof capable of implementing predetermined functions. As shown in FIG. 5, the device includes:

a first transmission module 501 configured to transmit an access accept message, wherein the access accept message carries an activation indication;

wherein, the activation indication is used for indicating a terminal to reactivate a public data network (PDN) connection or a protocol data unit (PDU) session of a source network in a target network, or indicating the terminal that the PDN connection or the PDU session has been activated in the target network.

In the embodiments of the present disclosure, as shown in FIG. 5, the device further includes:

a determination module 500 configured to determine, before the transmission module transmits the access accept message, whether a Nx interface exists between a management device corresponding to the target network and a management device corresponding to the source network;

if no Nx interface exists, the management device corresponding to the target network is determined to be incapable of acquiring the mobility management context from the management device corresponding to the source network.

In one embodiment, the determination module 500 is further configured to determine that, if the Nx interface exists between the management device corresponding to the target network and the management device corresponding to the source network, the management device corresponding to the target network is capable of acquiring the mobility management context from the management device corresponding to the source network.

In one embodiment, if no Nx interface exists between the management device corresponding to the target network and the management device corresponding to the source network, the activation indication is used for indicating the terminal to reactivate the PDN connection or the PDU session of the source network in the target network;

if the Nx interface exists between the management device corresponding to the target network and the management device corresponding to the source network, the activation indication is used for indicating the terminal that the PDN connection or the PDU session has been activated in the target network.

Figure 6:
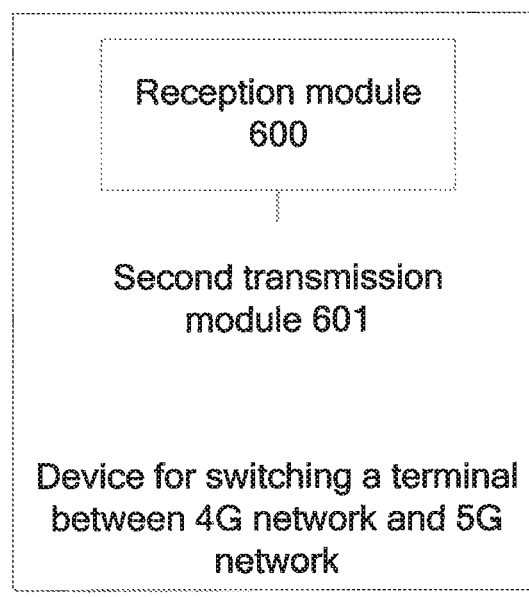
FIG. 6 is a structural diagram 2 of a device for switching a terminal between a 4G network and a 5G network according to an embodiment of the present disclosure.

The embodiments of the present disclosure further provide a device for switching a terminal between a 4G network and a 5G network, as shown in FIG. 6, the device includes:

a reception module 600, configured to receive an access accept message, where the access accept message carries an activation indication;

wherein, the activation indication is used for indicating a terminal to reactivate a public data network (PDN) connection or a protocol data unit (PDU) session of a source network in a target network, or indicating the terminal that the PDN connection or the PDU session has been activated in the target network.

In the embodiments of the present disclosure, as shown in FIG. 6, the device further includes: a second transmission module 601;

when the activation indication is used for indicating the terminal to reactivate the PDN connection or the PDU session in the target network, the second transmission module 601 is configured to transmit, after the reception module receives the access accept message, a PDN connection activation request message or a PDU session activation request message, the PDN connection activation request message or the PDU session activation request message carries a handover indication.

The embodiments of the present disclosure further provide a network management apparatus, which includes: the device shown in FIG. 5.

The embodiments of the present disclosure further provide a terminal device, which includes: the device shown in FIG. 6.

The present disclosure will be described below in detail in conjunction with several Scenario embodiments.

Figure 7:
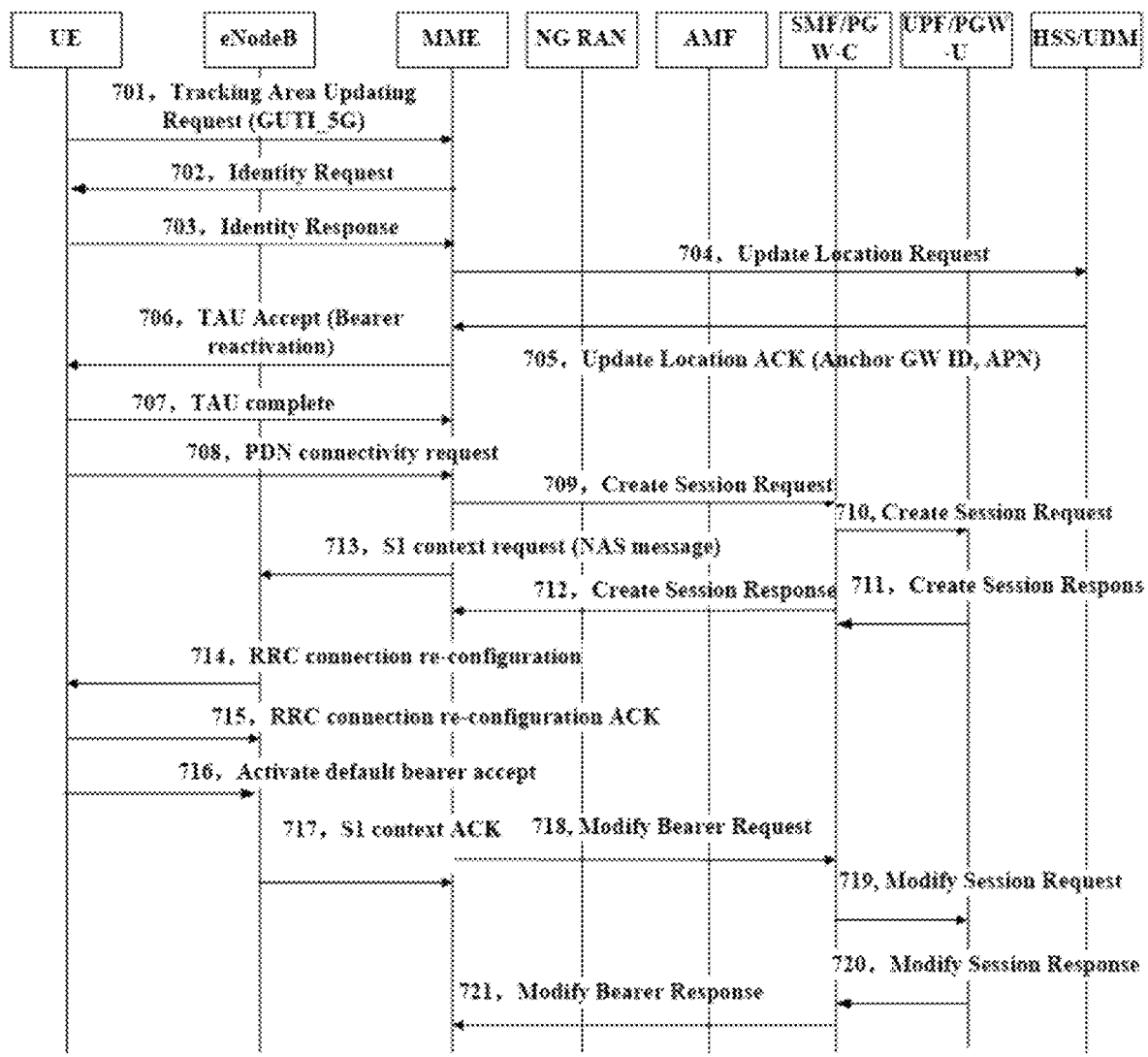
FIG. 7 is a flowchart of a method for switching a terminal from a 5G network to a 4G network according to embodiment one.

FIG. 7 is a flowchart of a method for switching a terminal from a 5G network to a 4G network according to Scenario embodiment one. As shown in FIG. 7, including:

Step 701: UE moves to an EPC system (the 4G network), and the UE transmits a tracking area updating request message to an MME, where the TAU request message carries a GUTI 5G which is allocated by the AMF in the 5G system.

Step 702: The MME acquires the original AMF through the GUTI 5G however, no interface exists between the MME and the AMF, so the MME is unable to acquire a context from the AMF, and the MME acquires a user IMSI by transmitting an identity request message to the UE.

Step 703: The UE returns an identity response message to the MME. The message carries the user IMSI.

Step 704: The MME transmits an update location request message to the HSS/UDM according to the IMSI, and the update location request message carries the IMSI.

Step 705: The HSS/UDM returns an update location ACK message to the MME, where the message carries user subscription data. The user subscription data may carry an SMF/PGW-C ID and an APN pair.

Step 706: The MME returns a TAU accept message to the UE, and the message carries a newly allocated GUTI and a valid TAI list. If the SMF/PGW-C ID and the APN are acquired in step 705, the TAU accept message further needs to carry a PDN connection/PDU session activation indication for indicating that the UE needs to reactivate the current PDN connection/PDU session in the target network.

Step 707: The UE returns a TAU complete message to the MME for indicating that the GUTI becomes valid.

Step 708: After receiving indication information in the TAU accept message, the UE transmits a PDN connectivity activation request message to the MME, where the message carries a PDN type and the APN, and a handover indication.

Step 709: The MME transmits a create session request message to the acquired PGW according to the APN and the PGW-C ID acquired in the step 705. The message carries the IMSI, the APN, a GTP-C address and the TEID of the MME, and bears a QoS, the handover indication, UE location information and a bearer ID.

Step 710: The PGW-C selects a UPF according to the UE location information, the PDN type or the DNN, and transmits the create session request message, the message carries a PGW-C address, IMSI, package detection, execution, reporting rules and the bearer ID. If the PGW-C allocates TEID information used by the UPF, this step further needs to carry the TEID information used by the UPF.

Step 711: The UPF returns a create session response message to the SMF. If the UPF allocates the TEID information used by the UPF, the step further needs to carry the TEID information used by the UPF.

Step 712: The PGW-C returns the create session response message to the MME, the message carries an address and TEID of the PGW-C, the TEID of the UPF.

Step 713: The MME transmits an S1 context request to the eNodeB, where the message carries the bearer ID, the QoS parameter, the TEID of the UPF, and also carries a NAS message-activation default bearer request message, and the activation default bearer request message carries the bearer ID and the QoS parameters, etc.

Step 714: The eNodeB transmits a RRC connection re-configuration message to the UE for establishing a radio bearer. The RRC connection re-configuration message further carries the activation default bearer request message.

Step 715: The UE returns a RRC connection re-configuration ACK message to the eNodeB.

Step 716: The UE returns an activate default bearer accept message.

Step 717: The eNodeB returns an S1 context ACK message to the MME, where the message carries user plane TED information of the eNodeB, and may also carry the activate default bearer accept message.

Step 718: The MME transmits a modify bearer request message to the PGW-C, and the message carries user plane TEID information of the eNodeB acquired in the step 717.

Step 719: The PGW-C transmits a session modification request message to the UPF, the message carries the user plane TEID information acquired by the eNodeB in the step 717. The UPF may transmit downlink data to the eNodeB after this step.

Step 720: The UPF returns a session modification response message to the PGW-C.

Step 721: The PGW-C returns the session modification response message to the MME.

The SGW unrelated to the present disclosure and a process of the SGW interacting with the present disclosure are omitted in this disclosure.

Figure 8:
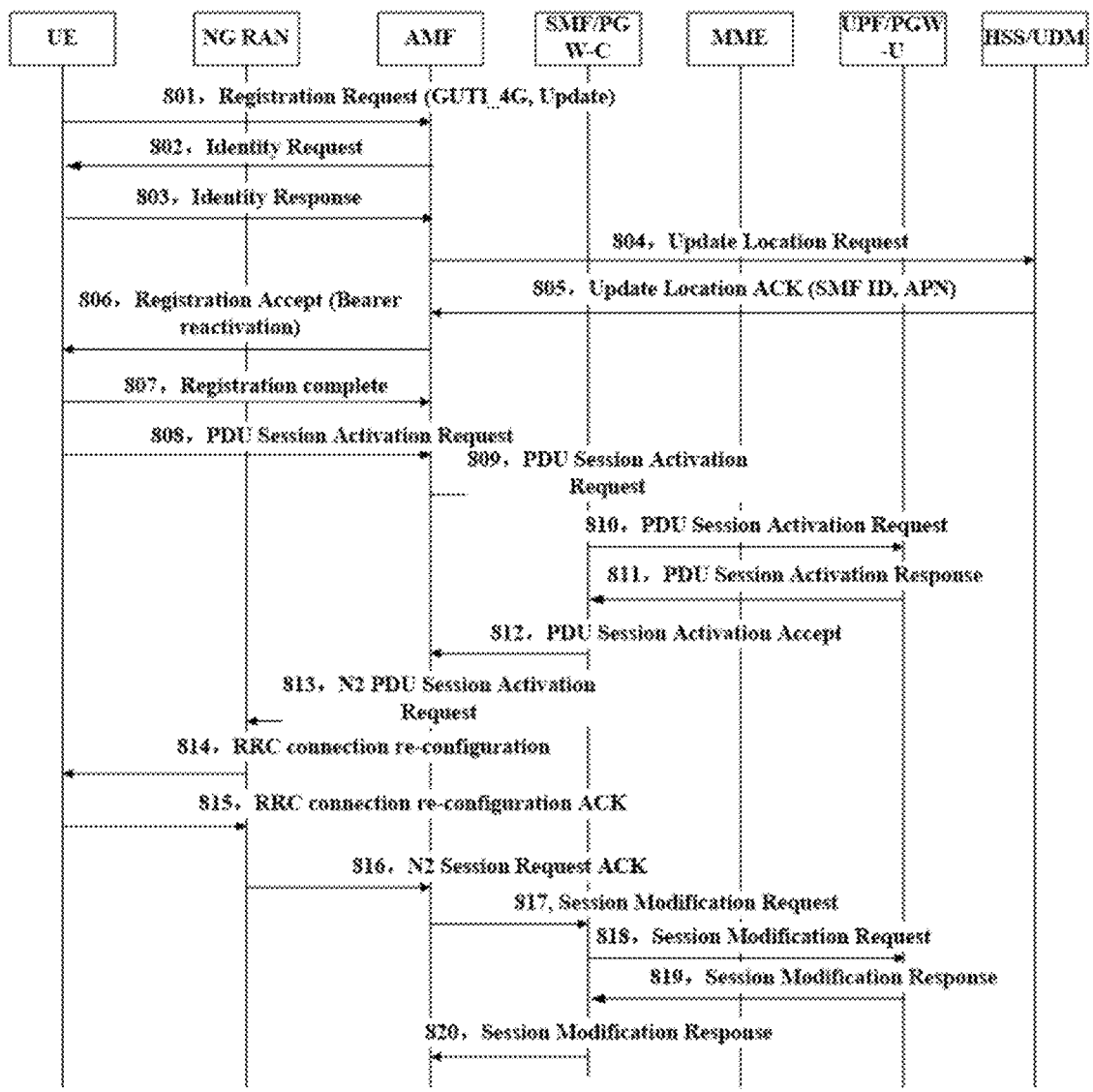
FIG. 8 is a flowchart of a method for switching a terminal from a 4G network to a 5G network according to embodiment two.

FIG. 8 is a flowchart of a method for switching a terminal from a 4G network to a 5G network according to scenario embodiment two. As shown in FIG. 8, the method includes steps described below.

Step 801: UE moves to a 5G system, and the UE transmits a registration request message to an AMF. The registration request message carries a GUTI 4G which is allocated by an MME in a 4G system.

Step 802: The AMF acquires the original MME through the GUTI 4G however, no interface exists between the MME and the AMF, so the AMF is unable to acquire a context from the MME, and the AMF acquires a user IMSI by transmitting an identity request message to the UE.

Step 803: The UE returns an identity response message to the AMF. The message carries the user IMSI.

Step 804: The AMF transmits an update location request message to the HSS/UDM according to the IMSI, and the update location request message carries the IMSI.

Step 805: The HSS/UDM returns an update location ACK message to the AMF, where the message carries user subscription data. The user subscription data may carry an SMF/PGW-C ID and a DNN pair.

Step 806: The AMF returns a registration accept message to the UE, the message carries a newly allocated GUTI and a valid TAI list. If the SMF/PGW-C ID and the DNN are acquired in step 805, the registration accept message further needs to carry a PDN connection/PDU session activation indication for indicating that the UE needs to reactivate the current PDN connection/PDU session in the target network.

Step 807: The UE returns a registration complete message to the AMF, indicating that the GUTI becomes valid.

Step 808: after the UE receives indication information in the registration accept message, the UE transmits a PDU session activation request message to the AMF, where the message carries a PDN type and the DNN, and a handover indication and a PDU session ID.

Step 809: The AMF transmits an SM session message PDU session activation request to the SMF according to the DNN, the PDN type and an SMF ID acquired in the step 805, the SM session message carries the IMSI, the PDU session activation request message, an AMF address, a GTP-C TED and UE location information.

Step 810: The SMF selects a UPF according to the UE location information, the PDN type or the DNN, and transmits the PDU session activation request message, where the message carries a SMF address, IMSI, package detection, execution, and reporting rules. If the SMF allocates TEID information used by the UPF, this step still needs to carry the TEID information used by the UPF.

Step 811: The UPF returns a PDU session activation response message to the SMF. If the UPF allocates the TEID information used by the UPF, the step further needs to carry the TEID information used by the UPF.

Step 812: The SMF returns an SM session message PDU session activation accept to the AMF, where the message carries a PDU session ID, a QoS parameter, a TED of the UPF, and the message carries a PDU session activation accept message.

Step 813: The AMF transmits a N2 PDU session request message to a NG RAN. The message carries the PDU session ID, the QoS parameter, the TED of the UPF, and the PDU session activation accept message.

Step 814: The NG RAN transmits a RRC connection re-configuration message to the UE for establishing a radio bearer according to the QoS parameter; the RRC connection re-configuration message also carries the PDU session activation accept message.

Step 815: The UE returns a RRC connection re-configuration ACK message to the NG RAN.

Step 816: The NG RAN returns a N2 PDU session request ACK message (N2 session request ACK) to the AMF, and the message carries TEID information of a NG RAN N3 interface.

Step 817: The AMF transmits a session modification request message to the SMF, and the message carries the TED information of the NG RAN N3 interface acquired in the step 816.

Step 818: The SMF transmits a session modification request message to the UPF, and the message carries the TEID information of the NG RAN N3 interface acquired in the step 816. The UPF may transmit downlink data to the NG RAN after this step.

Step 819: The UPF returns a session modification response message to the SMF.

Step 820: The SMF returns the session modification response message to the AMF.

Figure 9:
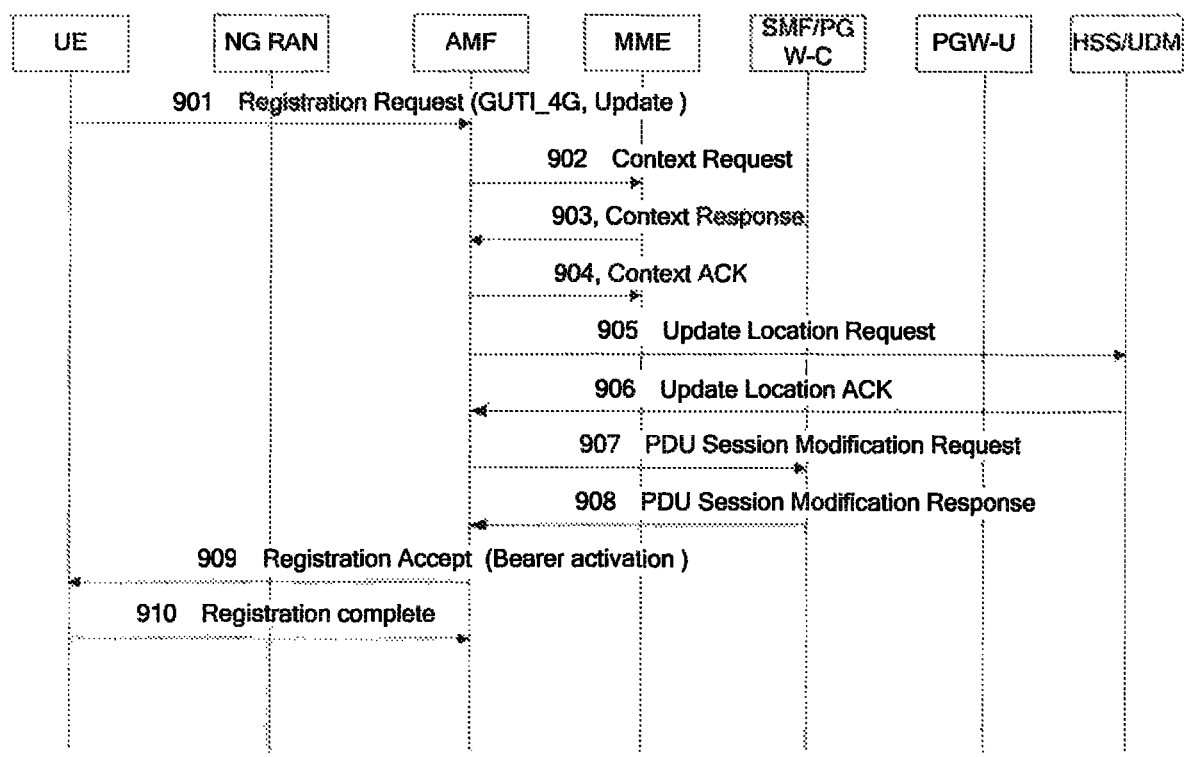
FIG. 9 is a flowchart of a method for switching a terminal from a 4G network to a 5G network according to embodiment three.

FIG. 9 is a flowchart of a method for switching a terminal from a 4G network to a 5G network according to scenario embodiment three. The PDU session has been successfully reestablished in the 5G network, as shown in FIG. 9, the method includes the steps described below.

Step 901: UE moves to a 5G system, and the UE transmits a registration request message an AMF. The registration request message carries a GUTI_4G; which is allocated by an MME in a 4G system.

Step 902: The AMF acquires the original MME through the GUTI_4G; because a Nx interface exists between the MME and the AMF, the AMF may acquire a context from the MME, and the AMF transmits a context request to the MME, and the message carries the GUTI_4G.

Step 903: The MME returns a context response message to the AMF, where the message carries a mobility management context and a bearer management context.

Step 904: The AMF returns a context ACK message to the MME.

Step 905: The AMF transmits an update location request message to an HSS/UDM according to an IMSI, and the message carries the IMSI, and an AMF address.

Step 906: The HSS/UDM returns an update location ACK message to the AMF, where the message carries user subscription data. The user subscription data may carry an SMF/PGW-C ID and a DNN pair.

Step 907: The AMF transmits a PDU session modification request message to the SMF according to an SMF ID acquired in step 903, where the message carries the AMF address and the TED.

Step 908: The SMF returns a PDU session modification response message to the AMF.

Step 909: The AMF returns a registration accept message to the UE, the message carries a newly allocated GUTI and a valid TAI list. The registration accept message further needs to carry a PDN connection/PDU session activated indication for indicating the UE that the PDN connection/PDU session has been activated in the target network.

Step 910: The UE returns a registration complete message to the AMF, indicating that the newly allocated GUTI becomes valid.

An embodiment of the present disclosure further provides a storage medium. The storage medium is configured to store computer programs which, when being executed, carry out the steps of any one of the above-mentioned method embodiments.

Optionally, in this embodiment, the above-mentioned storage medium may include, but is not limited to, a U disk, a read-only memory (ROM), a random access memory (RAM), a mobile hard disk, a magnetic disk, an optical disk or another medium capable of storing computer programs.

An embodiment of the present disclosure further provides an electronic apparatus, including a memory and a processor, where the memory is configured to store computer programs and the processor is configured to execute the computer programs for carrying out the steps in any one of the method embodiments described above.

It should be understood by those skilled in the art that the embodiments of the present disclosure may be provided as methods, systems, or computer program products. Therefore, the present disclosure may adopt a form of a hardware embodiment, a software embodiment, or a combination of hardware and software embodiments. In addition, the present disclosure may adopt a form of a computer program product implemented on one or more computer-usable storage media (including, but not limited to, a disk memory, an optical memory, and the like) which include computer-usable program codes.

The present disclosure is described with reference to flowcharts and/or block diagrams of methods, devices (systems) and computer program products according to the embodiments of the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processor of another programmable data processing device produce a means for implementing functions specified in one or more flows in the flowcharts and/or one or more blocks in the block diagrams.

These computer program instructions may also be stored in a computer-readable memory which may direct the computer or another programmable data processing device to operate in a particular manner so that the instructions stored in the computer-readable memory produce a manufactured product including an instructing means. The instructing means implements the functions specified in one or more flows in the flowcharts and/or one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

The above are only preferred embodiments of the present disclosure and are not intended to limit the scope of the present disclosure.

INDUSTRIAL APPLICABILITY

As described above, a method, device and apparatus for switching a terminal between a 4G network and a 5G network provided by the embodiments of the present disclosure have the following beneficial effect: compared with the existing art in which the terminal restarts an initial attachment procedure after receiving a TAU rejection message from an MME, a signaling process is reduced, network resources are saved and the energy consumption of the terminal is reduced at the same time.

We claim:

1. A method for switching a terminal between a fourth generation, 4G, network and a 5th generation, 5G, network, comprising:
   transmitting, by the terminal, a registration request message when moving from the 4G network to the 5G network;
   receiving, by the terminal, an access accept message from a management device corresponding to a target network, wherein the access accept message carries an activation indication;
   wherein the activation indication is used for indicating the terminal to reactivate a public data network, PDN, connection of a source network in a target network, and
   wherein the method further comprises after the receiving, by the terminal, an access accept message:
   transmitting, by the terminal, a protocol data unit, PDU, session activation request message, the PDU session activation request message carries a handover indication.

2. The method of claim 1, wherein the access accept message is a registration accept message received in response to the registration request message.

3. A non-transitory computer-readable medium comprising instructions which, when executed by a computer, cause the computer to carry out the method of claim 2.

4. A non-transitory computer-readable medium comprising instructions which, when executed by a computer, cause the computer to carry out the method of claim 1.

5. A method for switching a terminal between a fourth generation, 4G, network and a 5th generation, 5G, network, comprising:
   receiving, by a management device corresponding to the target network, a registration request message when the terminal is moving from the 4G network to 5G network;
   transmitting, by the management device corresponding to a target network, an access accept message, wherein the access accept message carries an activation indication;
   wherein the activation indication is used for indicating a terminal to reactivate a public data network, PDN, connection of a source network in the target network, and
   wherein the method further comprises after the transmitting, by the management device corresponding to a target network, an access accept message:
   receiving, by the management device corresponding to a target network, a protocol data unit, PDU, session activation request message comprising a handover indication.

6. The method of claim 5, wherein the access accept message is a registration accept message transmitted in response to the registration request message.

7. A non-transitory computer-readable medium comprising instructions which, when executed by a computer, cause the computer to carry out the method of claim 6.

8. A non-transitory computer-readable medium comprising instructions which, when executed by a computer, cause the computer to carry out the method of claim 5.

9. A network management apparatus for switching a terminal between a fourth generation, 4G, network and a 5th generation, 5G, network, the network management apparatus configured to receive a registration request message when the terminal is moving from the 4G network to the 5G network, the network management apparatus comprising:
   at least one processor of a transmitter, configured to transmit an access accept message, wherein the access accept message carries an activation indication
   wherein the activation indication is used for indicating the terminal to reactivate a public data network, PDN, connection of a source network in a target network,
   wherein the network management apparatus is configured, after the transmitting, by the at least one processor of the transmitter, an access accept message, to receive a protocol data unit, PDU, session activation request message comprising a handover indication.

10. A non-transitory computer-readable medium comprising instructions which, when executed by a computer, cause the computer to carry out the method of claim 9.

11. A terminal device for switching the terminal device between a fourth generation, 4G, network and a 5th generation, 5G, network, the terminal device configured to transmit a registration request message when moving from the 4G network to the 5G network, the terminal device comprising:
   at least one processor of a receiver, configured to receive an access accept message, wherein the access accept message carries an activation indication,
   wherein the activation indication is used for indicating a terminal to reactivate a public data network, PDN, connection of a source network in a target network; and
   at least one processor of a transmitter;
   wherein when the activation indication is used for indicating the terminal device to reactivate the PDN connection of the source network in the target network, the at least one processor of the transmitter is configured to transmit, after the access accept message is received by the at least one processor of the receiver, a protocol data unit, PDU, session activation request message, wherein the PDU session activation request message carries a handover indication.

12. A non-transitory computer-readable medium comprising instructions which, when executed by a computer, cause the computer to carry out the method of claim 11.

* * * * *

UNITED STATES PATENT AND TRADEMARK OFFICE
CERTIFICATE OF CORRECTION

PATENT NO. : 11,159,991 B2
APPLICATION NO. : 16/575550
DATED : October 26, 2021
INVENTOR(S) : Fei Lu, Zhendong Li and Jinguo Zhu It is certified that error appears in the above-identified patent and that said Letters Patent is hereby corrected as shown below:

In the Claims

Column 15, Line 17, in Claim 1, "a target" should read – the target –
Column 15, Line 19, in Claim 1, "an access" should read – the access –
Column 15, Line 36, in Claim 5, "the target" should read – a target –
Column 15, Line 41, in Claim 5, "a target" should read – the target –
Column 15, Line 43, in Claim 5, "a terminal" should read – the terminal –
Column 15, Line 48, in Claim 5, "a target" should read – the target –
Column 15, Line 49, in Claim 5, "an access" should read – the access –
Column 15, Line 50, in Claim 5, "a target" should read – the target –
Column 16, Line 23, in Claim 9, "an access" should read – the access –

Signed and Sealed this
Seventeenth Day of October, 2023

Katherine Kelly Vidal
*Director of the United States Patent and Trademark Office*